(12) United States Patent
Pescod

(10) Patent No.: US 7,239,809 B2
(45) Date of Patent: Jul. 3, 2007

(54) ELECTRICAL PULSE TRANSFORMATION USING OPTICAL DELAY LINES

(75) Inventor: Christopher Ralph Pescod, Essex (GB)

(73) Assignee: BAE Systems plc, London (GB)

( * ) Notice: Subject to any disclaimer, the term of this patent is extended or adjusted under 35 U.S.C. 154(b) by 226 days.

(21) Appl. No.: 10/110,051

(22) PCT Filed: May 8, 2001

(86) PCT No.: PCT/GB01/01965

§ 371 (c)(1),
(2), (4) Date: Jan. 23, 2003

(87) PCT Pub. No.: WO01/90792

PCT Pub. Date: Nov. 29, 2001

(65) Prior Publication Data
US 2003/0147653 A1 Aug. 7, 2003

(30) Foreign Application Priority Data
May 24, 2000 (GB) .................... 0012554.2

(51) Int. Cl.
*H04J 14/02* (2006.01)
(52) U.S. Cl. ........................................ 398/87
(58) Field of Classification Search ............ 398/79, 398/87, 161; 385/14, 15, 24, 27; 342/375, 342/372; 359/138; 367/149
See application file for complete search history.

(56) References Cited

U.S. PATENT DOCUMENTS

| | | | |
|---|---|---|---|
| 4,588,957 A | 5/1986 | Balant et al. ............... 330/4.3 |
| 4,738,527 A | 4/1988 | McBrien ..................... 356/5 |
| 5,121,240 A | 6/1992 | Acampora ................... 359/138 |
| 5,210,807 A | 5/1993 | Ames ........................ 385/24 |
| 5,414,548 A * | 5/1995 | Tachikawa et al. ........... 398/87 |
| 5,574,534 A * | 11/1996 | Nogiwa et al. .............. 359/337 |
| 5,583,516 A * | 12/1996 | Lembo ....................... 342/375 |
| 6,323,991 B2 * | 11/2001 | Cisternino et al. .......... 359/329 |
| 6,681,065 B1 * | 1/2004 | Minasian et al. ............. 385/27 |
| 2002/0122169 A1 * | 9/2002 | Lee et al. ................... 356/73.1 |
| 2003/0043697 A1 * | 3/2003 | Vakoc ........................ 367/149 |

FOREIGN PATENT DOCUMENTS

EP 0 140 579 A1 9/1984

(Continued)

OTHER PUBLICATIONS

"Ultimate Beam Capacity Limit of Fibre Grating Based True-Time-Delay Beam-Formers for Phased Arrays" Robert A. Minasian et al, IEEE 1998, pp. 1375-1378.*

(Continued)

*Primary Examiner*—Shi K. Li
(74) *Attorney, Agent, or Firm*—Crowell & Moring LLP

(57) ABSTRACT

A recirculating optical delay line 30 has a laser 32 controlled by wavelength control 33 so as to vary the wavelength of radiation over time to provide a first input 34 to an optical modulator 35. The modulator 35 modulates the intensity of the first input 34 with a pulsed electromagnetic frequency signal 36 to produce a pulsed modulated optical signal 39. The signal 39 passes through an optical coupler 40 into a delay loop 41 having a delay fibre 44 arranged to delay the signal 39 for a predetermined duration. The wavelength control 33 is arranged to vary the first input 35 so as to ensure that overlapping pulses of the signal 39 in the delay loop 41 are at different wavelengths, thereby inhibiting optical mixing effects between the overlapping pulses.

13 Claims, 4 Drawing Sheets

FOREIGN PATENT DOCUMENTS

| | | |
|---|---|---|
| EP | 0 392 416 A1 | 4/1990 |
| EP | 0 753 944 A1 | 7/1996 |
| EP | 0 924 539 A2 | 12/1998 |
| EP | 0 997 751 A2 | 10/1999 |
| JP | 10-200512 | 7/1998 |
| WO | WO 99/66660 | 6/1999 |

OTHER PUBLICATIONS

M. Ishikawa et al., "Optical Frequency Sweeper Using an Optical Ring Circuit with a Tunable Injection-Locking Filter", IEEE Photonics Technology Letters, vol. 11, No. 12, Dec. 1999.*

"Continuously Variable True Time-Delay Optical Feeder for Phased-Array Antenna Employing Chirped Fiber Gratings", J.L. Corral et al, IEEE 1997, pp. 1531-1536.

"Array Factor of Phased Array Antenna Steered by a Chirped Fiber Grating Beamformer" J.L. Cruz, IEEE 1998, pp. 1153-1155.

"Ultimate Beam Capacity Limit of Fibre Grating Based True-Time-Delay Beam-Formers for Phased Arrays" Robert A. Minasian et al, IEEE 1998, pp. 1375-1378.

"Optical Fiber Delay-Line Signal Processing" Kenneth P. Jackson et al, IEEE 1985, p. 193-210.

PCT International Search Report.
British Search Report.
European Search Report.

* cited by examiner

ELECTRICAL PULSE TRANSFORMATION USING OPTICAL DELAY LINES

The present invention relates to an optical delay line and to a method of generating a delayed optical signal.

BACKGROUND OF THE INVENTION

Optical fibre technology is gradually making an impact on electronic systems through their ability to implement various signal processing functions, for example producing multiple delays and microwave filtering. Optical fibres also offer a low loss, compact solution to the generation of long delays for optical signals. The low dispersion properties of optical fibres effectively provide modulation frequency independent delay lines that minimise degradation of an input radio frequency signal.

Currently such delays are introduced using recirculating optical delay lines which offer a number of advantages over alternative serial or parallel type delay line architectures and provide a low cost solution for the generation of a range of delays of a pulsed signal.

From FIG. 1, a prior art recirculating optical delay line 10 comprises a fixed wavelength carrier wave optical source 11 providing a first input 12 to an external optical modulator 13 arranged to modulate the light from the optical source 11 with a pulsed radio frequency signal 14 which passes through a radio frequency amplifier 15 to act as a second input 16 to the external optical modulator 13.

A modulated optical signal 17 is generated by the external optical modulator 13 which then passes through a two-by-two optical coupler 18 that is arranged to allow 50% of the modulated signal 17 to enter a delay loop 19 and the other 50% of the modulated signal 17 to bypass the delay loop 19 and to proceed to an output of the optional coupler 18. The delay loop 19 comprises an optical amplifier 20 in series with a band pass optical filter 21 and a delay fibre 22. It will be understood that the modulated signal 17 is a series of radio frequency modulated pulses having a pulse length determined by the pulsed radio frequency signal 14.

In this delay line 10 the modulated signal 17 enters the delay loop 19 through the two-by-two optical coupler 18 and circulates through the amplifier 20, filter 21 and delay fibre 22 to achieve the desired delay duration of each pulse of the modulated signal 17. It is important to note that the pulse length of each pulse of the modulated signal 17 must be equal to or less than the overall delay duration of the delay loop 19 in order to prevent coherent optical mixing affects between overlapping sections of the same pulse of the modulated optical signal 17. The coupler 18 is also arranged to extract delayed optical pulses 23 from the delay loop 19 after each circulation of a pulse of the modulated signal 17 around the delay loop 19. Each delayed optical pulse 23 is detected by a photodiode 24 which serves to convert each delayed optical pulse 23 into an electrical signal 25 which passes through a radio frequency amplifier 26 so as to produce a delayed pulsed radio frequency output 27.

However, prior art recirculating optical delay lines 10 are constrained by the requirement that the pulses of the radio frequency modulated signal 17 must have a shorter duration than the recirculating duration of the pulse around the delay loop 19 in order to prevent coherent optical mixing effects between overlapping sections of the same pulse of the modulated signal 23 when they are detected on the photodiode 24. In some applications the pulse duration of the modulated signal 17 may be unknown or uncontrolled.

SUMMARY OF THE INVENTION

EP-A2-0,997,751 addresses the problem of coherent mixing effects, but for overlapping sections of successive pulses rather than for overlapping sections of the same pulse as is the problem here. The overlap between successive pulses is caused by dispersion within optical fibres causing pulse broadening to the extent that the trailing edge of one pulse overlaps with the leading edge of the successive pulse. This problem is addressed by applying a desired phase response to pulses.

The article "Continuously Variable True Time-Delay Optical Feeder for Phased-Array Antenna Employing Chirped Fiber Gratings" by Corral et al. (IEEE Transactions on Microwave Theory and Techniques, vol. 45, pages 1531-1536), EP-A1-0,392,416 and U.S. Pat. No. 5,210,807 disclose optical delay lines employing wavelength-tuneable lasers as their optical sources, although none of these documents addresses the problem of coherent optical mixing effects due to overlapping sections of optical pulses. Instead, all three documents address a common problem of obtaining a variable delay time from a single delay line.

In the case of the IEEE Article and U.S. Pat. No. 5,210,807, variable delay times are achieved by using a series of Bragg gratings at different positions along the delay line, such that different path lengths are obtained by reflecting selectively from different Bragg gratings. The Bragg gratings have different reflecting wavelengths, so that a desired reflection point along the delay line can be selected by injecting light with the appropriate wavelength. This is done by tuning a laser to the appropriate wavelength, this wavelength being applied to the entire pulse such that a uniform time delay is obtained for the entire pulse.

In the case of EP-A-0,392,416, variable delay times are achieved by using a highly-dispersive optical fibre, such that the time taken for a pulse of light to propagate through the delay line varies appreciably with the wavelength of light. A laser is tuned to the appropriate wavelength, the same wavelength being used throughout an entire pulse so that a uniform time delay is obtained for the entire pulse.

It is an object of the present invention to obviate or mitigate the problems associated with the prior art, especially to inhibit coherent optical mixing of pulses of light in a delay line.

According to a first aspect of the invention an optical delay line, comprising an optical source arranged to generate intensity modulated pulses of light, a delay fibre arranged to carry the pulses of light, an optical coupler arranged to allow the pulses of light to enter and to exit the delay fibre and characterised by an optical source controller arranged to vary the wavelength of each pulse of light such that each successive portion of each pulse of light within the delay fibre is segregated by wavelength.

In this manner, the optical source controller ensures that overlapping pulses of intensity modulated light within the optical delay line are at different optical wavelengths and hence coherent optical mixing effects between the overlapping pulses of light is inhibited. Therefore, input pulses of light to the delay fibre can have a longer duration than the delay fibre delay duration without distortion of the pulses of light due to coherent optical mixing effects between overlapping pulses of light and the optical delay line can be optimised for shorter delay times.

In one embodiment of the invention a delayed pulse combiner may be arranged to construct a delayed electrical signal from the delayed pulses of light after they have exited the delay fibre in accordance with the wavelength of the portions of each delayed pulse of light. The delayed pulse combiner may comprise one or more Bragg fibre gratings arranged to segregate the portions of the pulses of light after they have exited the delay fibre in accordance with their wavelength. At least one of the Bragg fibre grating may have an associated photodiode arranged to convert impinging portions of the pulses of light into an electrical sub-signal. An electrical combiner may be arranged to construct the delayed electrical signal from the electrical sub-signals produced by photodiode associated with each Bragg grating. In this manner, pulses of light of a given wavelength are detected prior to being combined so as to reconstruct the delayed electrical signal. The optical coupler may be a 2 to 2 optical coupler.

In another embodiment of the invention a tuneable bandpass optical filter may be arranged to construct a delayed electrical signal from the portions of the delayed pulses of light after they have exited the delay fibre in accordance with the wavelength of each delayed pulse of light. The tuneable bandpass optical filter may be arranged to allow portions of the pulses of light to exit the delay fibre in accordance with their wavelength. The tuneable bandpass optical filter may be controlled by the optical source controller so as to vary the wavelength of the tuneable bandpass optical filter in time with the variation in the wavelength of the portions of the pulses of light. Preferably, the optical coupler may comprise a 2 by 1 optical coupler and an optical circulator.

An optical modulator may be arranged to generate the pulses of light by modulating a light source with a pulsed electromagnetic frequency input. For example, the electromagnetic frequency input may be a pulsed radio frequency input, in this matter, a delayed pulsed radio frequency output from the optical delay line is achieved.

The optical source may be a distributed feedback semiconductor laser.

According to another aspect of the invention, there is provided a method of generating a delayed electrical signal comprising generating modulated pulses of light, passing the pulses of light through a delay fibre, constructing the delayed electrical signal from the electrical sub-signals, and characterised by varying the wavelength of the pulses of light with respect to time such that successive portions of each pulse of light within the delay fibre are segregated by wavelength, and by converting delayed pulses of light to electrical sub-signals after they have exited the delay fibre according to the wavelength of the portions of each delayed pulse of light.

Other objects, advantages and novel features of the present invention will become apparent from the following detailed description of the invention when considered in conjunction with the accompanying drawings.

DETAILED DESCRIPTION OF THE INVENTION

Figure 1:
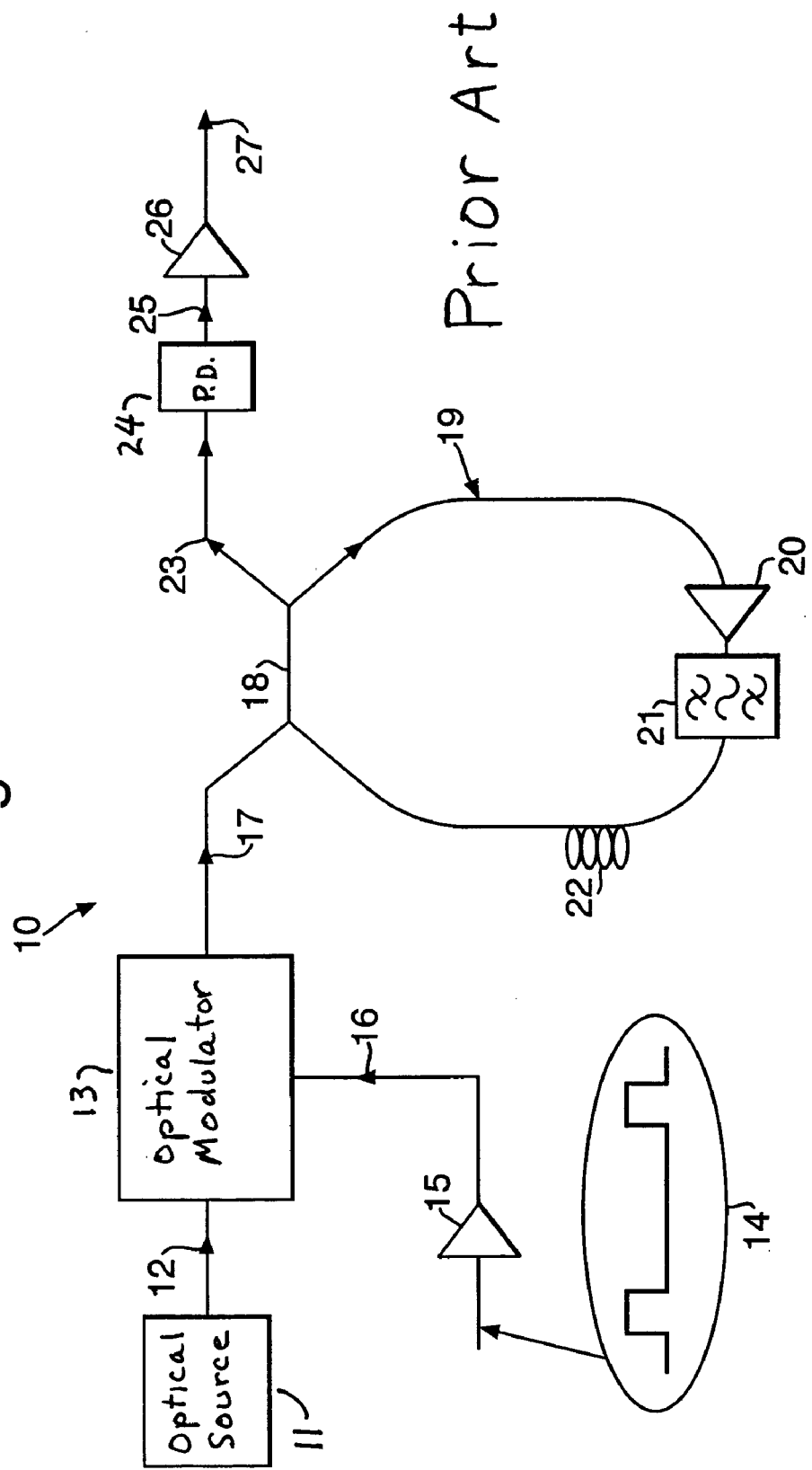
FIG. 1 illustrates a prior art recirculating optical delay line.
Figure 2:
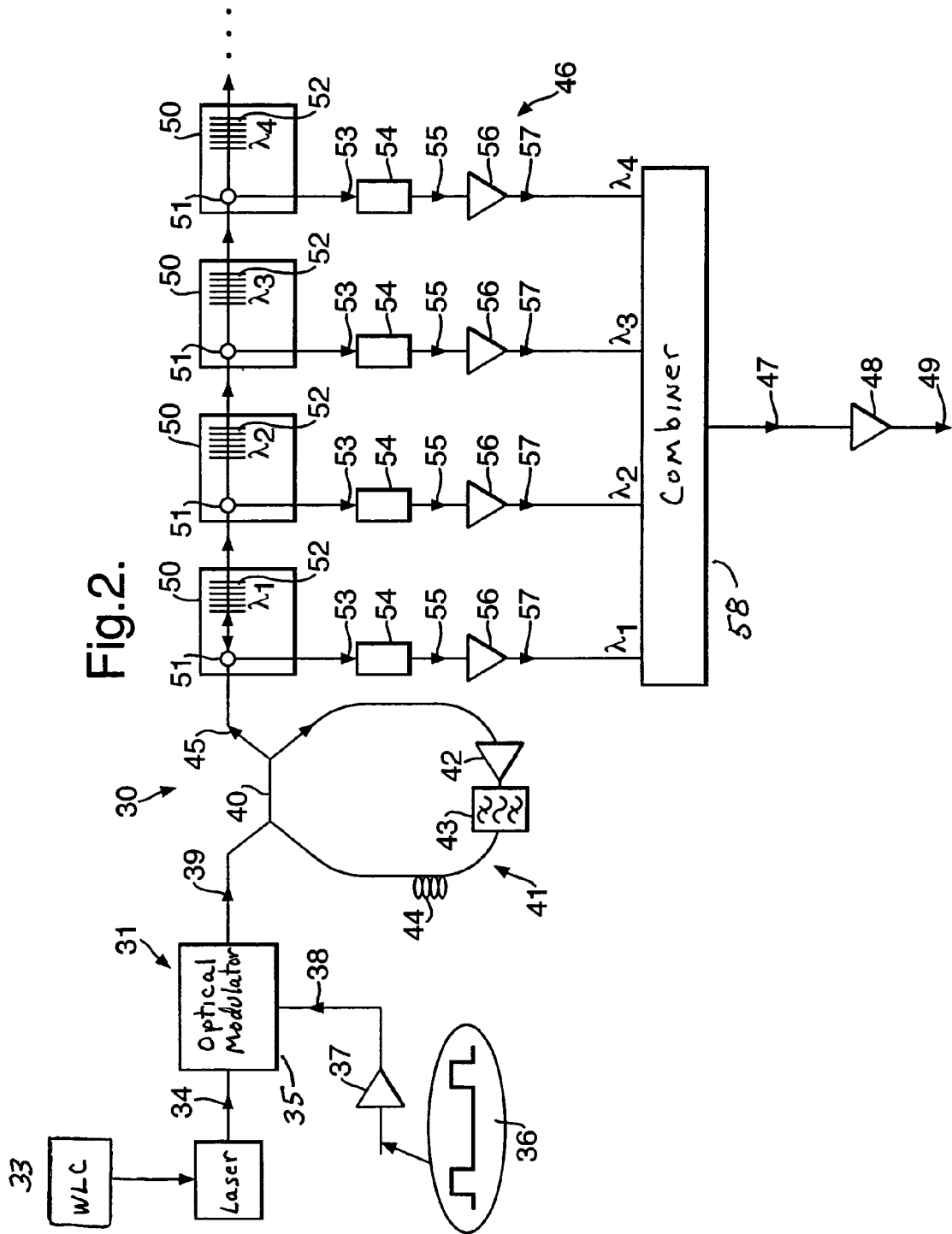
FIG. 2 illustrates an embodiment of a recirculating optical delay line according to the present invention.

Referring to FIG. 2, a recirculating optical delay line 30 comprises a variable wavelength carrier wave optical source 31 comprising a laser 32 having a wavelength control 33 to vary the wavelength of radiation generated by the laser 32 with respect to time so as to provide a first input 34 to an external optical modulator 35. The external optical modulator 35 is arranged to modulate the intensity of the first input 34 from the optical source 31 with a pulsed electromagnetic frequency signal 36, for example a pulsed radio frequency signal, which passes through an amplifier 37 to act as a second input 38 to the external optical modulator 35.

A modulated optical signal 39 is generated by the external optical modulator 35 which then passes through a two-by-two optical coupler 40 that is arranged to allow 50% of the modulated signal 39 to enter a delay loop 41 and the other 50% of the modulated signal 17 to bypass the delay loop 41 and proceed to an output of the optical coupler 40. The delay loop 41 comprises an optical amplifier 42 in series with a bandpass optical filter 43 and a delay fibre 44. It will be understood that the modulated signal 39 comprises a series of intensity modulated optical pulses having a pulse length determined by the pulsed signal 36 and an intervening period having a reduced intensity, that is a continuous signal during the interpulse period.

The optical coupler 40 is also arranged to extract delayed optical pulses 45 from the delay loop 41 after each circulation of a pulse of the modulated signal 39 has circulated around the delay loop 41.

The optical pulses 45 pass to a delayed signal combiner 46 arranged to construct a delayed electrical signal 47 from the delayed optical pulses 45 extracted from the delay loop 41 in accordance with the wavelength of each delayed optical pulse 45. The operation of the delayed signal combiner 46 is described in greater detail below. Each delayed electrical signal 47 is amplified in a signal amplifier 48 so as to produce a delayed pulsed output 49.

The delayed signal combiner 46 comprises a number of sub-units 50 arranged in series with one another, each comprising a optical circulator 51 arranged to allow the delayed optical pulses 45 to pass to a Bragg fibre grating 52 arranged to either reflect delayed optical pulses 45 having a wavelength corresponding to that written into the Bragg fibre grating 52 or to allow delayed optical pulses 45 of an alternative wavelength to pass onto the next sub-unit 50. It will be understood that the delayed optical pulses 45 will pass through the optical circulators 51 of the sub-units 50 until they are reflected by a Bragg fibre grating 52 having a corresponding wavelength. A reflected delayed optical pulse 45 will return to the optical circulator 51 associated with the Bragg fibre grating 52 from which it was reflected, where it will then be diverted by the optical circulator 51 down an associated arm 53 to a photodiode 54 which serves to convert the delayed optical signal 45 diverted to that arm 53 into an electrical signal 55 which then passes through a signal amplifier 56 so as to produce a delayed electrical sub-signal 57. An electrical combiner 58 serves to combine the electrical sub-signals from each arm 53 so as to produce a single output, that is electrical signal 47. The delayed signal combiner 46 ensures that each sub-signal 57 of a different wavelength is detected separately before being summed coherently at the electrical combiner 58.

Figure 3:
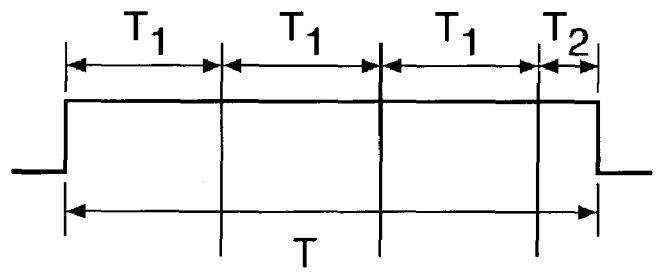
FIG. 3 illustrates the relationship between an input pulse of a given duration and a recirculating duration of an optical delay line according to the invention.

FIG. 3 indicates the relationship between the pulse length T of the pulsed signal 36, and the delay recirculation time $T_1$ of a modulated signal 39 through the delay loop 41 described with reference to FIG. 2. It will be noted that the recirculation optical delay line 30 has been arranged to accommodate pulsed signals 36 whose pulse length is up to four times the duration provided by the recirculating delay line 41. That is in FIG. 3 the pulse length T is over three times the length of the duration $T_1$ provided by the delay line. It will be understood, that more sub-units 52 can be added to the delay compensator 46 if a longer pulsed signal 36 pulse length is required to be accommodated by the delay loop 41. From FIG. 3, it will be noted that the input pulse length T does not need to be an integer multiple of $T_1$. This is indicated by the time period of pulse length $T_2$, where $T_2 \leq T_1$.

The laser 32 of FIG. 2 can be a distributed feedback semi-conductor laser having a line width of between 1 to 4 MHz and its wavelength can be adjusted by controlling a combination of its input bias current (typically 1.1 GHz per mA) and its temperature (typically 0.1 nm per C.° which is approximately equivalent to 12.5 GHz per C.°). The bias current provides a fast wavelength control response while the temperature control of the laser gives a large tuning range at a slower rate.

Figure 4:
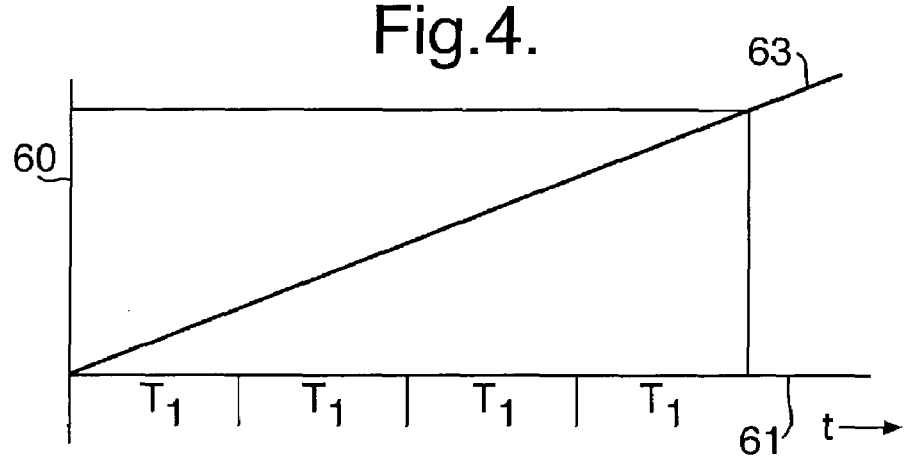
FIG. 4 illustrates the relationship between laser wavelength and duration of an optical delay line according to one embodiment of the invention.
Figure 5:
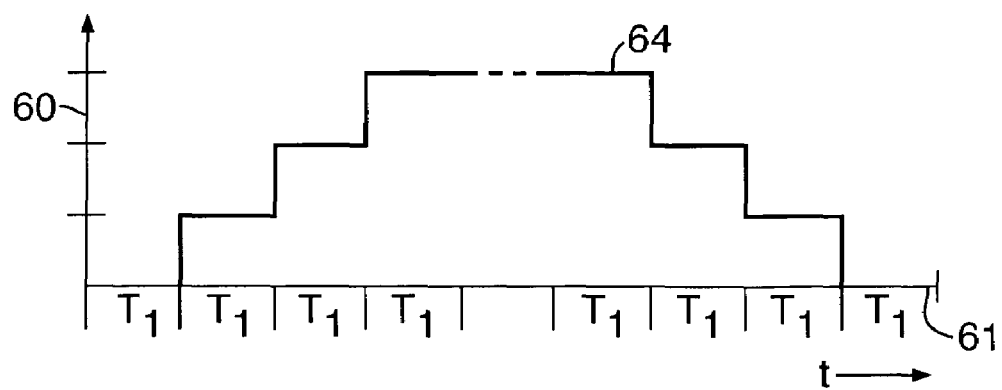
FIG. 5 illustrates the relationship between laser wavelength and duration of an optical delay line according to an alternative embodiment of the invention.

FIG. 4 indicates the relationship between laser wavelength shown along the ordinate 60 and the delay line recirculating time $T_1$ given as time t along the abscissa 61. It is the objective of the variation in laser wavelength, illustrated as graph line 63, to ensure that delayed optical pulses within a delay loop at substantially the same time operate at different wavelengths. The wavelength variation between recirculations can be controlled, as indicated in FIG. 4, using a liner control waveform, that is graph line 63. Alternatively, as indicated in FIG. 5 in which like references have been used to indicate similar integers to those shown in FIG. 4 the wavelength variation can be controlled using a step wavelength control waveform, illustrated as graph line 64. An advantage of the stepped wavelength control waveform is that the laser is not required to sweep back to an initial starting wavelength at some point during the wavelength variation.

For example, if the line width of the laser is 4 MHz, the linewidth will broaden to approximately 0.46 nm (that is equivalent to 57.4 GHz) at a level of approximately 30 dBc. For recirculation delay times $T_1$ of 10 microseconds, this requires a wavelength tuning rate of 0.046 nm per microsecond (that is equivalent 5.7 GHz per microsecond). It will be understood that different laser wavelength tuning rates will be required for use with alternative recirculating delay times $T_1$. The 0.046 nm per microsecond wavelength tuning rate will require a laser tuning control algorithm which combines both laser temperature and bias current control, as is known from the prior art.

Tuneable semi-conductor laser diodes can offer a wider electronically controlled tuning range and may be suitable for application requiring a larger tuning range.

Figure 6:
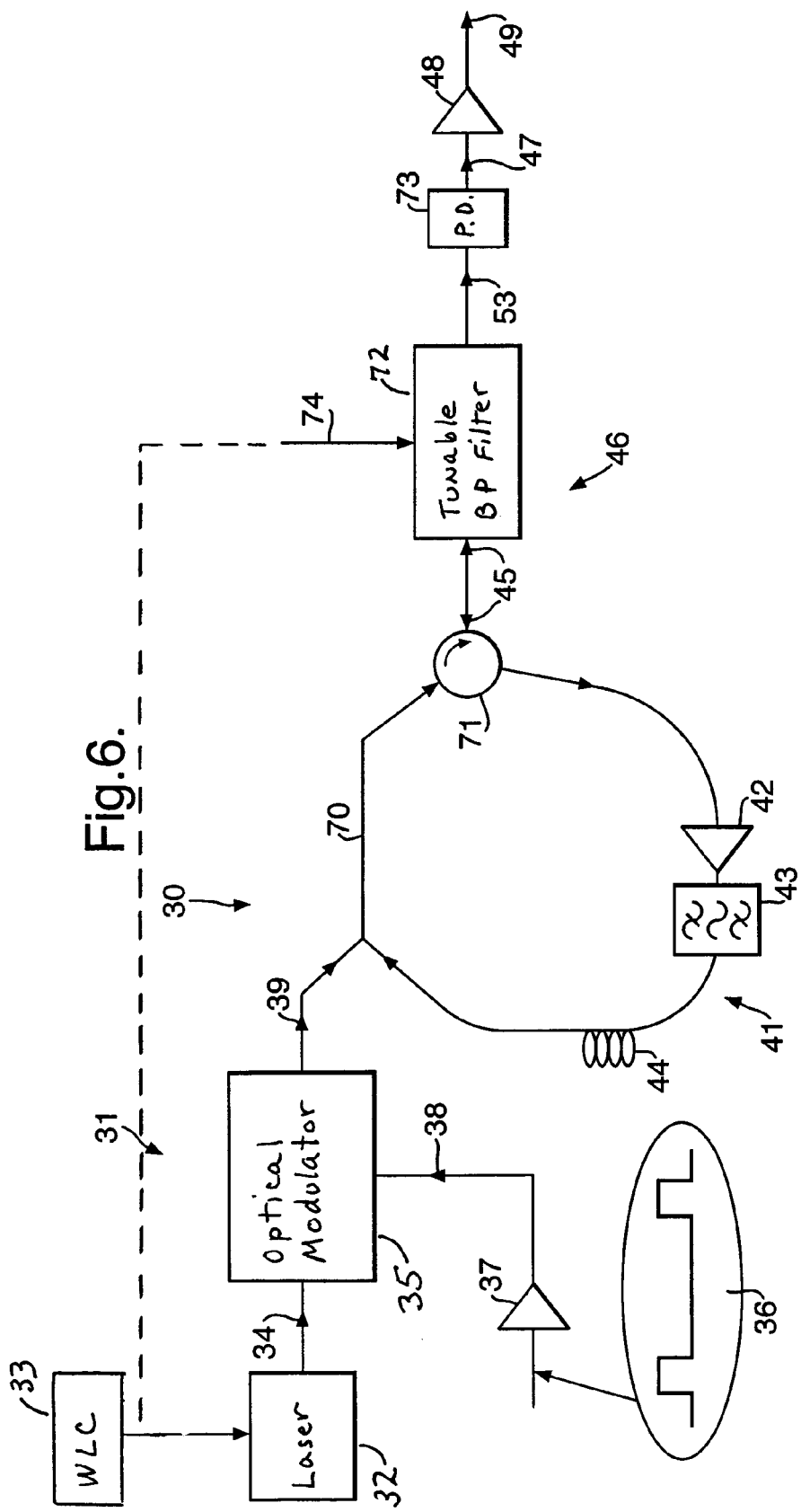
FIG. 6 illustrates an alternative embodiment of a recirculating optical delay line according to the present invention.

In FIG. 6, in which like references have been used to indicate similar integers to those shown in FIG. 2, the two by one optical coupler 70 allows the modulated signal 39 to enter the delay loop 41 which also includes, in series with the optical amplifier 42, the bandpass filter 43 and the delay fibre 44, an optical circulator 71 which allows delayed optical pulses 45 to pass to an optical tuneable bandpass filter 72 that allows a delayed optical pulse 45 of a given wavelength to pass to a single photodiode 73. The optical tuneable bandpass filter 72 can be controlled by a wavelength control 74 arranged to allow delayed optical pulses 45 of the correct wavelength to pass through the optical tuneable bandpass filter 72 or the wavelength control 74 can be substantially the same as wavelength control 33 to the laser 32. Delayed optical pulses 45 which do not pass through the optical tuneable bandpass filter 72 are reflected and recirculate around the delay loop 41 until such time as the wavelength control 74 allows the optical tuneable bandpass filter 72 to pass delayed optical pulse 45 of that given wavelength. It will be understood that it is the control of the optical tuneable bandpass filter 72 which allows the construction of the delayed electrical signal 47.

The tuneable bandpass filter 72 of FIG. 6 enables a single recirculated pulse 45 to be selected from multiple recirculated pulses within the delay loop 41 whereas the optical delay line 30, as illustrated in FIG. 2, outputs all delayed pulses in the delay loop 41.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An optical delay line, comprising:
an optical source arranged to generate intensity modulated pulses of light;
a recirculating optical delay fiber loop arranged to carry the pulses of light;
an optical coupler arranged to allow the pulses of light to enter and to exit the delay fiber loop; and
an optical source controller arranged to control the optical source to vary the wavelength within each pulse of light at the output of the optical source, such that each successive portion of a given pulse of light, corresponding to successive recirculations of the same pulse of light within the delay fiber loop, has a different wavelength as it enters said delay fiber loop.

2. The optical delay line as claimed in claim 1, wherein a first combiner is arranged to construct a delayed electrical signal from the delayed pulses of light after they have exited the delay fiber loop in accordance with the wavelength of the portions of each delayed pulse of light.

3. The optical delay line as claimed in claim 2, wherein the first combiner comprises at least one Bragg fiber grating arranged to segregate the portions of the pulses of light after they have exited the delay fiber loop in accordance with their wavelength.

4. The optical delay line as claimed in claim 3, wherein at least one Bragg fiber grating has an associated photodiode arranged to convert impinging portions of the pulses of light into an electrical sub-signal.

5. The optical delay line as claimed in claim 4, wherein a second combiner is arranged to construct the delayed electrical signal from the electrical sub-signals produced by each photodiode associated with each Bragg grating.

6. The optical delay line as claimed in claim 5, wherein the optical coupler is a 2 by 2 optical coupler.

7. An optical delay line, comprising:
an optical source arranged to generate intensity modulated pulses of light;
a recirculating delay fiber loop arranged to carry the pulses of light;
an optical coupler arranged to allow the pulses of light to enter and to exit the delay fiber loop; and
an optical source controller arranged to vary the wavelength of each pulse of light such that each successive portion of a given pulse of light, corresponding to successive recirculations of the same pulse of light within the delay fiber loop, has a different wavelength, wherein a tuneable bandpass optical filter and a photodiode are arranged to construct a delayed electrical signal from the delayed pulses of light after they have exited the delay fiber loop, in accordance with the wavelength of the portions of each delayed pulse of light.

8. The optical delay line as claimed in claim 7, wherein the tuneable bandpass optical filter is arranged to allow the portions of the pulses of light to exit the delay fiber loop in accordance with their wavelength.

9. The optical delay line as claimed in claim 8, wherein the tuneable bandpass optical filter is controlled by the optical source controller so as to vary the wavelength of the tuneable bandpass optical filter in time with the variation in the wavelength of the portions of the pulses of light.

10. The optical delay line as claimed in claim 9, wherein the optical coupler comprises a 2 by 1 optical coupler and an optical circulator.

11. The optical delay line as claimed in claim 10, wherein an optical modulator is arranged to generate the pulses of light by modulating a light source with a pulsed electromagnetic frequency input.

12. The optical delay line as claimed in claim 11, wherein the optical source includes a distributed feedback semiconductor laser.

13. A method of generating a delayed electrical signal, comprising the steps of:

generating modulated pulses of light;

passing the pulses of light through a recirculating delay fiber loop;

varying the wavelength within each of said pulses of light with respect to time, such that each successive portion of a given pulse of light, corresponding to successive recirculations of the same pulse of light within the delay fiber loop, has a different wavelength; and converting the delayed pulses of light into electrical sub-signals after they have exited the delay fiber and according to the wavelength of the portions of each delayed pulse of light; and constructing the delayed electrical signal from the electrical sub-signals.

* * * * *